US012725972B2

(12) United States Patent
Silbernagel et al.

(10) Patent No.: US 12,725,972 B2
(45) Date of Patent: Sep. 1, 2026

(54) TERMINAL FOR ELECTRICAL LINES

(71) Applicant: Phoenix Contact GmbH & Co. KG, Blomberg (DE)

(72) Inventors: Eugen Silbernagel, Loehne (DE); Dennis Habirov, Bielefeld (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 656 days.

(21) Appl. No.: 18/253,042

(22) PCT Filed: Nov. 9, 2021

(86) PCT No.: PCT/EP2021/081085

§ 371 (c)(1),
(2) Date: May 16, 2023

(87) PCT Pub. No.: WO2022/106261

PCT Pub. Date: May 27, 2022

(65) Prior Publication Data

US 2023/0420886 A1 Dec. 28, 2023

(30) Foreign Application Priority Data

Nov. 17, 2020 (LU) ........................................ 102205

(51) Int. Cl.

| | |
|---|---|
| ***H01R 13/639*** | (2006.01) |
| ***H01R 4/48*** | (2006.01) |
| ***H01R 11/09*** | (2006.01) |
| ***H01R 13/502*** | (2006.01) |

(52) U.S. Cl.
CPC ........... *H01R 13/639* (2013.01); *H01R 4/484* (2023.08); *H01R 11/09* (2013.01); *H01R 13/502* (2013.01); *H01R 4/4821* (2023.08); *H01R 4/4833* (2023.08)

(58) Field of Classification Search
CPC .... H01R 13/639; H01R 13/502; H01R 4/484; H01R 4/4821; H01R 4/4833; H01R 11/09
See application file for complete search history.

(56) References Cited

U.S. PATENT DOCUMENTS

| | | | | |
|---|---|---|---|---|
| 2004/0235344 A1* | 11/2004 | Kleeberger ........ | H01R 13/6215 439/540.1 |
| 2015/0147907 A1 | 5/2015 | Goerlitzer et al. | |
| 2020/0203878 A1* | 6/2020 | Arlitt ................. | H01R 13/7032 |

FOREIGN PATENT DOCUMENTS

| | | | |
|---|---|---|---|
| CN | 207199517 U | 4/2018 |
| DE | 4444551 A1 | 6/1996 |
| DE | 102012009286 A1 | 11/2013 |
| DE | 202016103277 U1 | 9/2017 |
| EP | 3671800 A1 | 6/2020 |
| WO | WO 2014169339 A1 | 10/2014 |

* cited by examiner

*Primary Examiner* — Jane J Rhee
(74) *Attorney, Agent, or Firm* — LEYDIG, VOIT & MAYER, LTD.

(57) ABSTRACT

A terminal for electrical lines includes: a housing forming a mounting region on which a disconnecting element is mounted so as to move between a contact position, in which the disconnecting element electrically interconnects two contacts, and a disconnecting position, in which the disconnecting element electrically disconnects the two contacts from each other. Two components of the terminal each form at least one portion of the mounting region.

12 Claims, 6 Drawing Sheets

TERMINAL FOR ELECTRICAL LINES

CROSS-REFERENCE TO PRIOR APPLICATIONS

This application is a U.S. National Phase application under 35 U.S.C. § 371 of International Application No. PCT/EP2021/081085, filed on Nov. 9, 2021, and claims benefit to Luxembourg Patent Application No. LU 102205, filed on Nov. 17, 2020. The International Application was published in German on May 27, 2022 as WO/2022/106261 A1 under PCT Article 21(2).

FIELD

The invention relates to a terminal for electrical lines.

BACKGROUND

Such a terminal comprises a housing, which forms a mounting region, in which a disconnecting element is mounted so as to move between a contact position, in which the disconnecting element electrically interconnects two contacts, and a disconnecting position, in which the disconnecting element electrically disconnects the two contacts from each other.

Such a terminal, in the form of a disconnecting terminal with multiple parallel disconnecting elements, is described in DE 20 2016 103 277 U1.

In such terminals, the disconnecting elements are generally mounted on the housing via a pin of the respective disconnecting element, which pin is received in a hole in a housing part of the terminal. This hole functions not only for fastening the disconnecting element, but also as a pivot point. Via the pivot point, the disconnecting blade can be pivoted, e.g., into a shaft, in order to close an electrical circuit. As a result, the hole and the shaft for the disconnecting element are, however, usually orthogonal to one another. If the housing is to be produced in plastic injection molding, this means, however, in terms of the demolding of the housing, that a slide is needed in the injection-molding tool and forms either the hole or the shaft, which also leads to at least one additional lateral opening. This may constitute an optical impairment and may, moreover, allow dirt to enter. Furthermore, the opening may impair the insulation, because it generally shortens the distance to conducting components.

Slides in injection-molding tools are furthermore not only technically complex, but also cost-intensive. Furthermore, the use of slides is not possible in all housing shapes, so that the use of one or more such slides regularly restricts the design freedom, which makes production more difficult.

SUMMARY

In an embodiment, the present invention provides a terminal for electrical lines, comprising: a housing forming a mounting region on which a disconnecting element is mounted so as to move between a contact position, in which the disconnecting element electrically interconnects two contacts, and a disconnecting position, in which the disconnecting element electrically disconnects the two contacts from each other, wherein two components of the terminal each form at least one portion of the mounting region.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
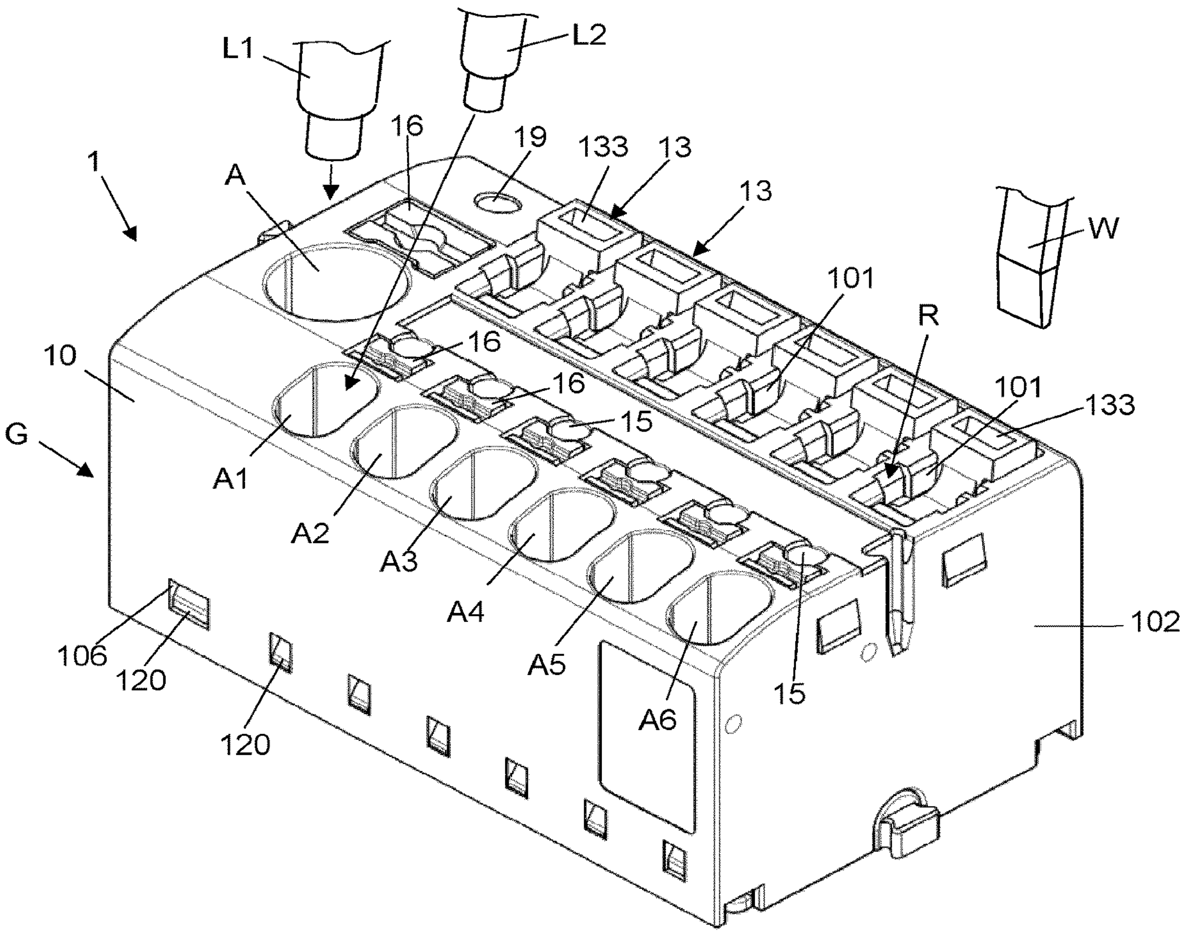
FIG. 1 shows a view of an exemplary embodiment of a terminal for electrical lines in the form of a disconnecting terminal with multiple disconnecting elements, wherein the disconnecting elements are each arranged in a contact position.

In an embodiment, the present invention provides a particularly simple-to-produce terminal for electrical lines.

Accordingly, it is provided that two components of the terminal each form at least one portion of the mounting region.

This makes it possible to provide the mounting point for the disconnecting element (e.g., on the housing) and to nevertheless produce the components (e.g., housing parts) in an injection-molding process without the use of a slide. Moreover, the mounting point can form part of a latching connection, and in particular serve as a latching receptacle. A component, e.g., the disconnecting element, can be latchable with the mounting point. As a result, the production of the terminal can be significantly simplified. Optionally, the terminal forms a mounting point on both sides of the disconnecting element.

Optionally, in cross-section, both portions of the mounting region describe a circular arc—each in particular describing a semicircle or less. Thus, the disconnecting element can be mounted in a simple manner and directly onto the two components, and only a few parts are needed. Together, the two portions of the mounting region form, for example, a circular-cylindrical receptacle. For example, one of the portions or both portions of the mounting region is or are trough-shaped.

In particular, the disconnecting element can be mounted on the mounting region so as to pivot about a pivot axis. This enables a particularly simple movement between the contact position and the disconnecting position. For example, the disconnecting element comprises a pin, which is received in the mounting region, and, in particular, in each case a pin which, in, respectively, one of the two mounting regions formed on both sides of the disconnecting element.

In one embodiment, the housing forms a receptacle within which the disconnecting element can be moved. This makes it possible that, at least in one of its positions, the disconnecting element does not project or projects only in part from the housing, whereby accidental movement of the disconnecting element relative to the housing can be prevented. The receptacle is designed, for example, in the form of a shaft. For example, the receptacle (the shaft) extends in the housing perpendicularly to the pivot axis.

At least one of the components, e.g., a first housing part, has at least one outer wall which is closed at a point to which the pivot axis points. Since no slide is necessary for the production of this housing part by means of an injection-molding tool, the outer wall of the housing can be closed at the rectilinear extension of the pivot axis so as to be materially uniform. This enables insulation protection and makes it possible to prevent, for example, dirt or liquids from entering at the disconnecting element and to thus protect the region of the particularly sensitive disconnecting point between the contacts that can be electrically interconnected by means of the disconnecting element.

For example, the first housing part is designed in the form of an (in particular, outer) upper shell. In this respect, it may be provided that the second component (e.g., in the form of a second housing part) be able to be inserted into the upper shell. As a result, a largely uniform outer surface is possible, as well as a particularly simple assembly.

In one development, the first housing part and a further housing part (e.g., a third housing part) can be latched with one another in a form-fitting manner by means of one or more latching hooks. This enables quick and simple assembly. The latching hook(s) are formed, for example, on the second housing part and each engage, for example, in an opening in the first housing part in a latching manner.

The disconnecting element comprises, for example, a contact blade which, for example, can be inserted in an electrically-contacting manner into at least one slot of a connection conductor, which is electrically connected to one of the contacts. This enables an electrical connection that is easy to produce, can be disconnected again, and is at the same time secure.

The disconnecting element optionally comprises an engagement region to which a tool can be applied in order to move the disconnecting element between the contact position and the disconnecting position by means of the tool. As a result, the disconnecting element can be constructed to be particularly small.

The two components are produced, for example, from plastic, and in particular in the form of plastic injection-molded parts. While the above-described embodiment of the mounting region can achieve simplification in many conceivable production methods, it is particularly effective in the case of injection-molded parts.

The housing furthermore forms multiple connections for electrically connecting in each case one electrical line. In this respect, it may be provided that at least one of the connections be designed, for example, in the form of a push-in connection, wherein other types of connections are also conceivable. This enables the terminal to be connected particularly simply and quickly. In addition, it is possible to design and arrange such push-in connections to be particularly space-saving.

The terminal may be designed in the form of a disconnecting terminal which, for example, comprises a collecting connection, which can be electrically connected to multiple connections arranged in a row, via one of multiple disconnecting elements in each case. Optionally, the terminal comprises an insert which is arranged between the first and the second housing parts and which has one or more partition walls.

FIG. 1 shows a terminal 1 for connecting electrical lines L1, L2. In the present case, the terminal 1 is constructed in the form of a disconnecting terminal and comprises a housing G with, next to a connection referred to here as a collecting connection A for simplified reference, multiple—by way of example, six (alternatively, for example, two, four, eight, ten, or twelve)—connections A1-A6 for one electrical conductor L2 in each case. The collecting connection A and each of the connections A1-A6 are provided on the common housing G. The collecting connection A and each of the connections A1-A6 form a respective receptacle into which an electrical conductor L1, L2 can be inserted in order to electrically contact a contact region in the interior of the terminal 1. Via each of the connections A1-A6, an electrical conductor L2 respectively connected thereto can be electrically connected to an electrical conductor L1 connected to the collecting connection A.

Figure 2:
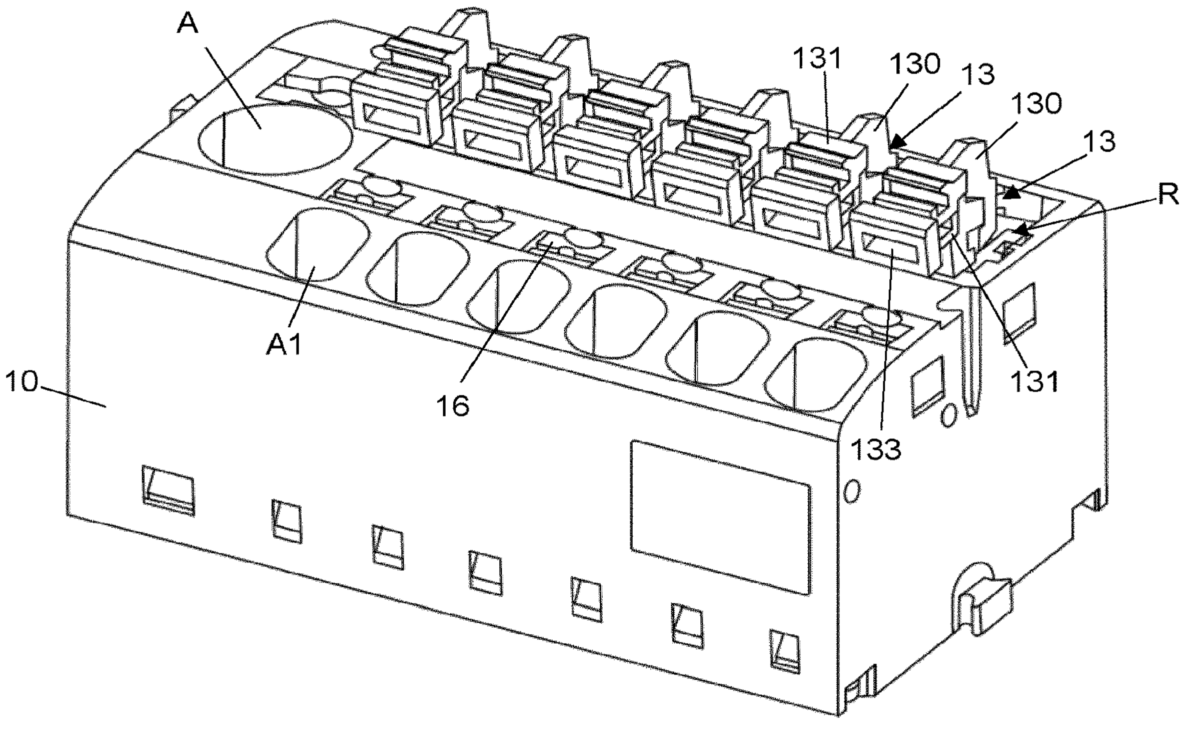
FIG. 2 shows a view of the terminal according to FIG. 1, wherein the disconnecting elements are arranged in a disconnecting position.

Furthermore, the terminal 1 comprises a disconnecting element 13 for each of the connections A1-A6. Each of the disconnecting elements 13 is mounted on the terminal 1 so as to move, and, in the example shown, pivot—specifically, between a disconnecting position and a contact position. FIG. 1 shows the disconnecting elements 13 in each case in the contact position, in which the disconnecting element 13 electrically connects the respective connection A1-A6 to the collecting connection A. FIG. 2 shows the disconnecting elements 13 in each case in the disconnecting position, in which the respective connections A1-A6 are electrically disconnected from the collecting connection A. By moving a disconnecting element 13 into the disconnecting position, a circuit can thus be opened. Conversely, a circuit can be closed by moving a disconnecting element 13 into the contact position.

Figure 9:
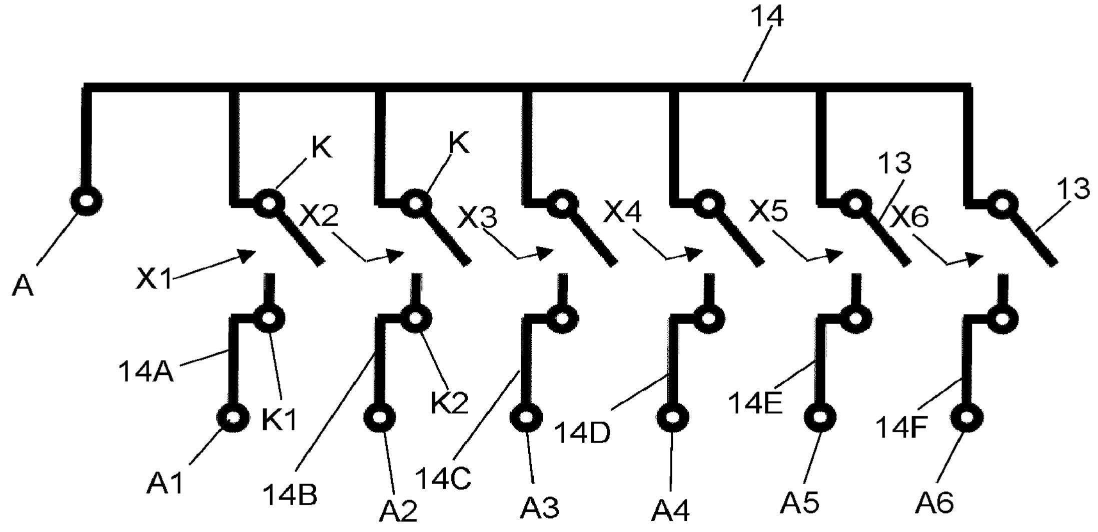
FIG. 9 shows a circuit diagram of the terminal according to FIG. 1.

FIG. 9 shows this structure in the form of a circuit diagram. The collecting connection A is electrically connected to multiple—in the present case, six—contacts K via a connection conductor, which is referred to below as a collecting connection conductor 14 for simplified reference. Each of the multiple—in the present case, six—connections A1-A6 is electrically connected to a contact K1-K6 via a respective connection conductor 14A-14E. The disconnecting elements 13 are each mounted so as to move between the contact position, in which the respective disconnecting element 13 electrically interconnects two contacts K, K1-K6 (namely, a contact K of the collecting connection conductor 14 and one of the contacts K1-K6, which is associated with the respective disconnecting element 13), and the disconnecting position, in which the disconnecting element 13 electrically disconnects the two contacts K, K1-K6 from each other. In FIG. 9, the disconnecting elements 13 are each shown simplified in the form of a switch; it is pointed out that it is also possible that the disconnecting elements 13 in the respective disconnecting position electrically contact neither of the two contacts K, K1-K6 that can be electrically connected thereto.

A disconnection point X1-X6, which can be electrically closed by means of the respective disconnecting element 13, is thus provided between the collecting connection conductor 14 and each of the connection conductors 14A-14F.

In order to move the disconnecting elements 13 between the disconnecting position and the contact position, each disconnecting element 13 comprises an engagement region 133 for engagement by a tool W. In the present case, the engagement region 133 is preferably formed in each case in the form of a slot, in which the tool W designed as a slotted screwdriver can engage, wherein a manually operable region on the disconnecting element 13 is also conceivable (e.g., when the terminal 1 is designed as a blade disconnecting terminal).

The disconnecting elements 13 are mounted on the housing G so as to move—specifically, in the present case, in such a way that each of the disconnecting elements 13 can be moved in a respective receptacle R in the housing G. The receptacles R are each designed in the form of a shaft.

FIGS. 1 and 2 furthermore show that each of the disconnecting elements 13 has a pivot body 131 on which the engagement region 133 is formed and to which a contact blade 130 is fastened. The contact blade 130 is made of electrically-conductive material. The disconnecting element 13 can also be referred to as a disconnecting blade.

The collecting connection A has a larger cross-section than the individual connections A1-A6. Both the collecting connection A and the connections A1-A6 are designed in the form of push-in connections. The electrical lines L1, L2, e.g., cables, can thus simply be inserted into the respective receptacle A, A1-A6 in order to produce an electrical contact in the interior of the terminal 1 and at the same time be held thereon. This mode of operation is explained in more detail below. In order to release the connection of the electrical lines L1, L2 to the terminal 1, the terminal in each case comprises a slide 16, which can be actuated—in the present case, can be pushed deeper into the housing G—by means of a tool, e.g., the tool W.

Next to each of the slides 16 of the parallel connections A1-A6, an (optional) display 15 is arranged. In the example shown, an LED is in each case accommodated in the housing G for this purpose. The position of the respective disconnecting element 13 can be displayed by means of the display 15. Next to the collecting connection A (more precisely, next to the slide 16 of the collecting connection A), an opening is formed through which a test contact 19 is accessible—for example, in order to check a voltage applied to the collecting connection A.

The housing G comprises a first housing part 10, which is shown in FIGS. 1 and 2 and is designed in the present case in the form of an upper shell. The first housing part 10 is formed in one piece. The first housing part 10 can be and, in the present case, is produced by injection molding—specifically, by means of an injection-molding tool which consists of (exactly) two tool halves and does not comprise any additional slides.

The housing G comprises form-locking means—in the present case, for forming dovetail connections—in order to be connected in a form-fitting manner to structurally identical terminals 1 or, in general, to suitably designed components. Multiple terminals 1 and/or further components can thus be connected to a longer row.

On the upper side of the first housing part 10, insertion openings of the connections A, A1-A6 are arranged. The disconnecting elements 13 are likewise arranged on this upper side (and, in the example shown, so are the slides 16). Furthermore, a labeling surface is (optionally) provided on the upper side—in the present case, between the connections A1-A6 and the associated disconnecting elements 13. The first housing part 10 in each case forms a receiving portion 101 of each of the receptacles R.

Figure 4:
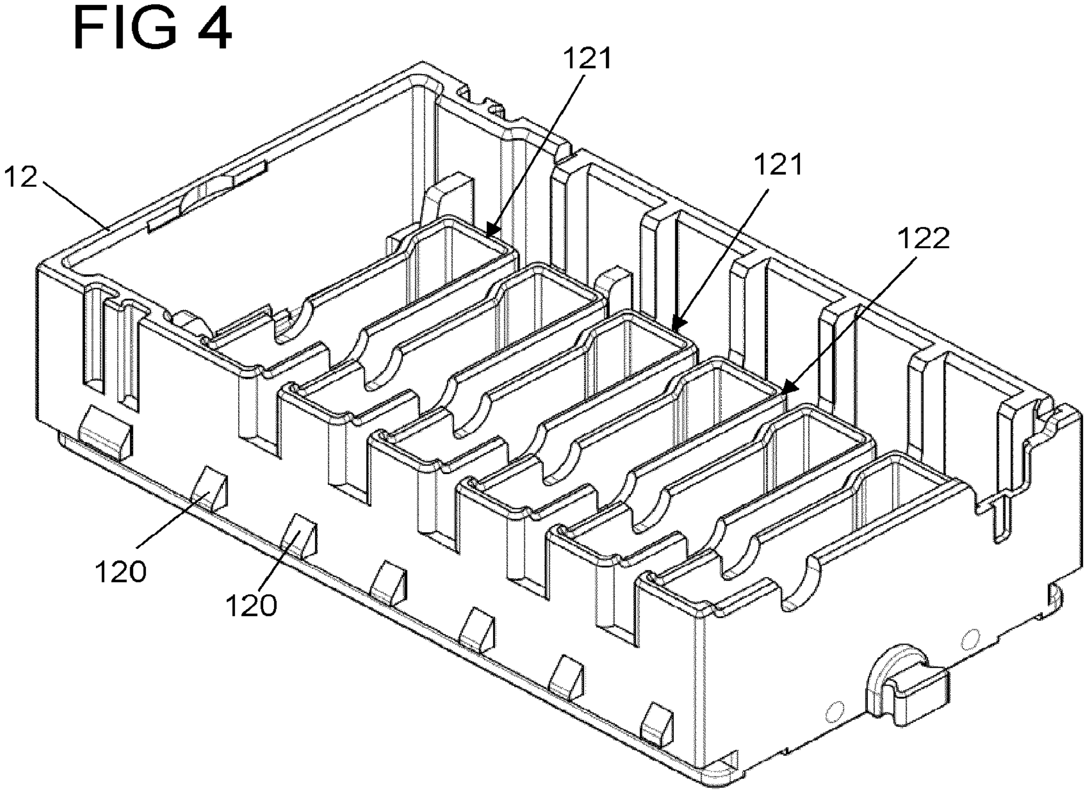
FIG. 4 shows a view of a third housing part of the housing of the terminal according to FIG. 1.

Next to the (upper) first housing part 10, the housing G comprises a second housing part 11 (shown, for example, in FIG. 5) and a third housing part 12 (shown, for example, in FIG. 4).

In the mounted state of the terminal 1, the first housing part 10 is fixedly connected to the third housing part 12—specifically, in a form-fitting manner. For this purpose, the first and third housing parts 10, 12 comprise latching elements so that the housing parts 10, 12 can be fastened to one another simply, quickly, and securely. In the present case, multiple openings 106 are provided on the first housing part 10—specifically, in side walls (which extend substantially perpendicularly to the upper side). Corresponding latching projections—specifically, latching hooks 120—are formed on the third housing part 12 and are configured to latch with the openings 106 of the first housing part 10.

Figure 3:
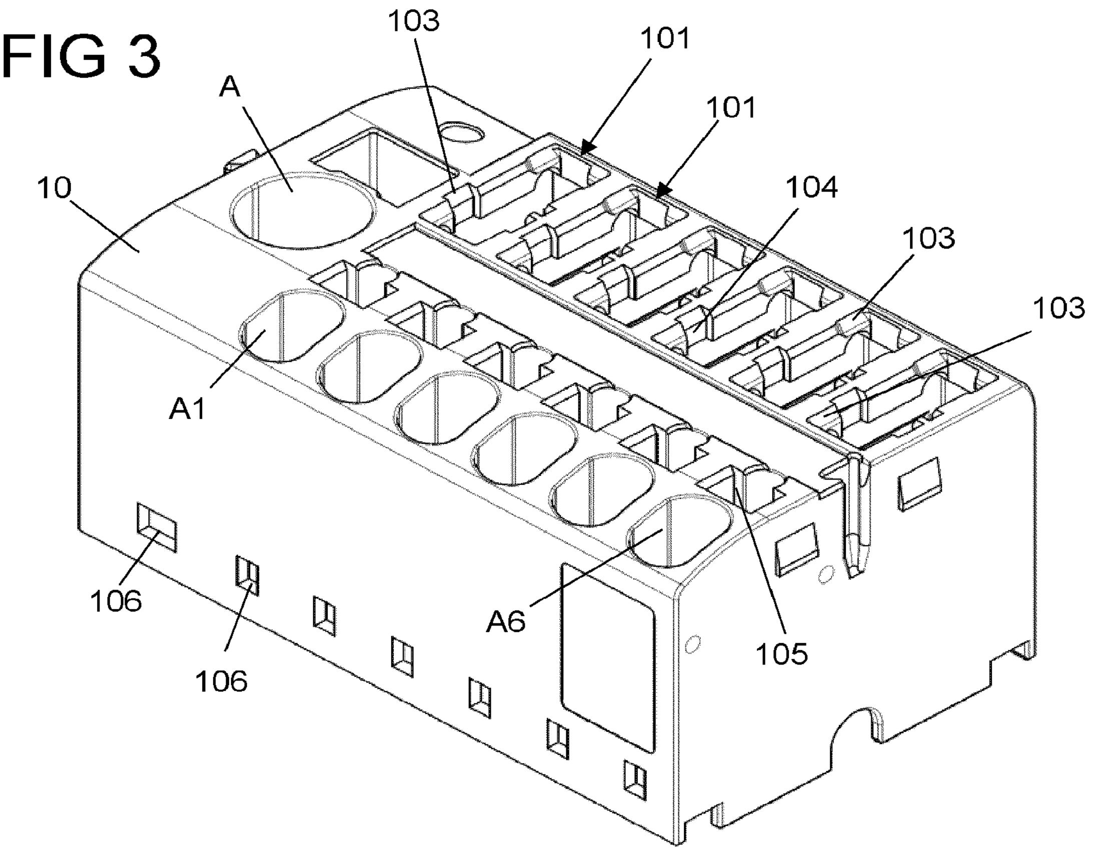
FIG. 3 shows a view of a first housing part, formed as an upper shell, of a housing of the terminal according to FIG. 1.

FIG. 3 shows the first housing part 10 separately. It can be seen that each shaft-shaped receiving portion 101 has a generally rectangular opening cross-section in the example shown. However, lateral (optional) recesses 104, e.g., for guiding the disconnecting elements 13, are additionally provided on the sides of the opening of the respective receiving portions 101. Furthermore, (optional) insertion bevels 103 are formed on the sides of the opening of the respective receiving portions 101 in order to latch the disconnecting elements 13 on the housing G.

FIG. 4 shows the already mentioned third housing part 12. The third housing part 12 is designed such that it can be inserted into the first housing part 10. For each of the connections A1-A6 electrically connectable to the collecting connection A, the third housing part 102 comprises a cage 121. The cage 121 for each of the connections A1-A6 has partition walls, by means of which electrical conductors electrically connected to the connections A1-A6 are electrically insulated from the adjacent connections and the electrical conductors electrically connected to the collecting connection A.

In the present case, a distance—specifically, a gap 122—is formed between the cage 121 of each of the connections A1-A6 and the cage 121 of the respectively adjacent connection A1-A6 (or the cages 121 of the respectively adjacent connections A1-A6).

Figure 5:
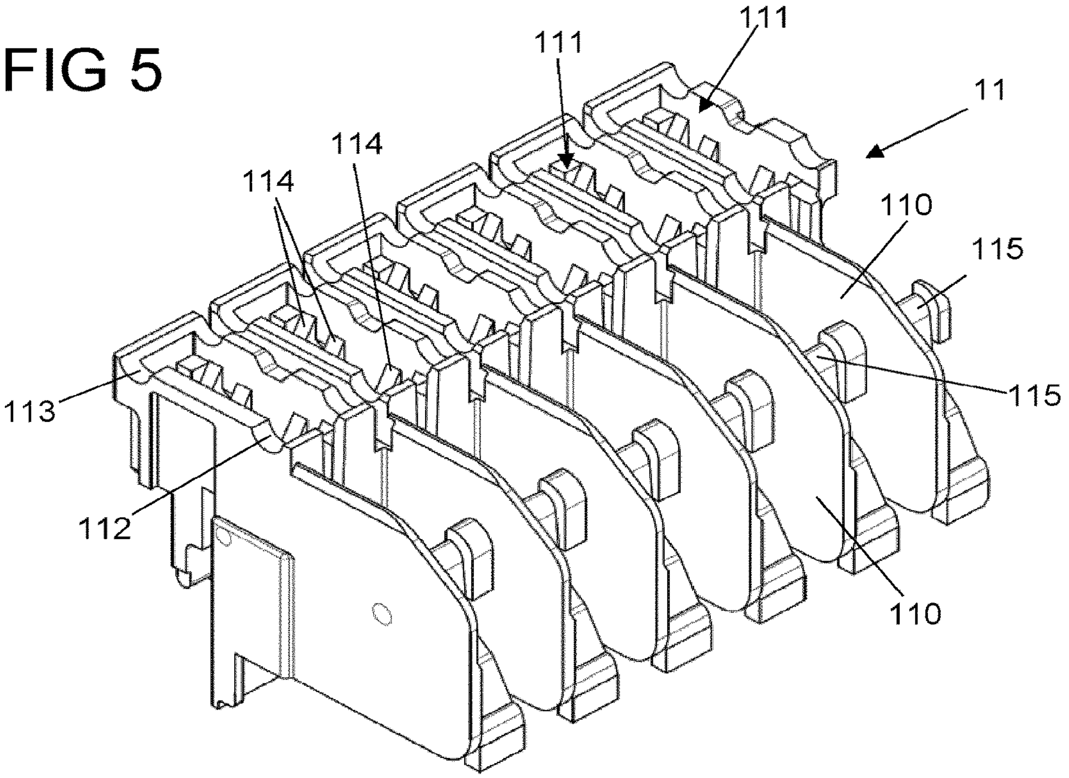
FIG. 5 shows a view of a second housing part of the terminal according to FIG. 1, which second housing part can be inserted between the first and third housing parts.

FIG. 5 shows the second housing part 11 of the terminal 1. In the mounted state of the terminal 1, the second housing part 11 is enclosed between the first housing part 10 and the third housing part 12. In the present case, the second housing part 11 is arranged in an interior space defined by the first housing part 10 and the third housing part 12. The second housing part 11 is formed in one piece. The second housing part 11 can be and, in the present case, is produced by injection molding—specifically, by means of an injection-molding tool which preferably consists of (exactly) two tool halves and does not comprise any additional slides.

The second housing part 11 furthermore forms, for each of the disconnecting elements 13, a receiving portion 111 of the corresponding receptacle R. The receiving portion 111 of the second housing part 11 adjoins the respective receiving portion 101 of the first housing part 10. Each of the receiving portions 111 is defined by walls on which multiple recesses 112 are formed. In the present case, the recesses 112 are trough-shaped—more specifically, in cross-section, they describe a circular arc. Several of these recesses 112 each form a portion T1 of a mounting region L, shown in FIG. 7, for the corresponding disconnecting element 13.

In each of the receiving portions 111, holders 114 are formed for connection conductors 14, 14A-14F, which are explained in more detail in connection with FIG. 6.

The second housing part 11 furthermore comprises multiple partition walls 110. In the mounted state of the terminal 1, one of the partition walls 110 extends in each case into one of the gaps 122, which enables particularly good insulation of adjacent connections A, A1-A6 and thus comparatively high voltages, with, simultaneously, particularly small dimensions of the terminal 1.

Figure 7:
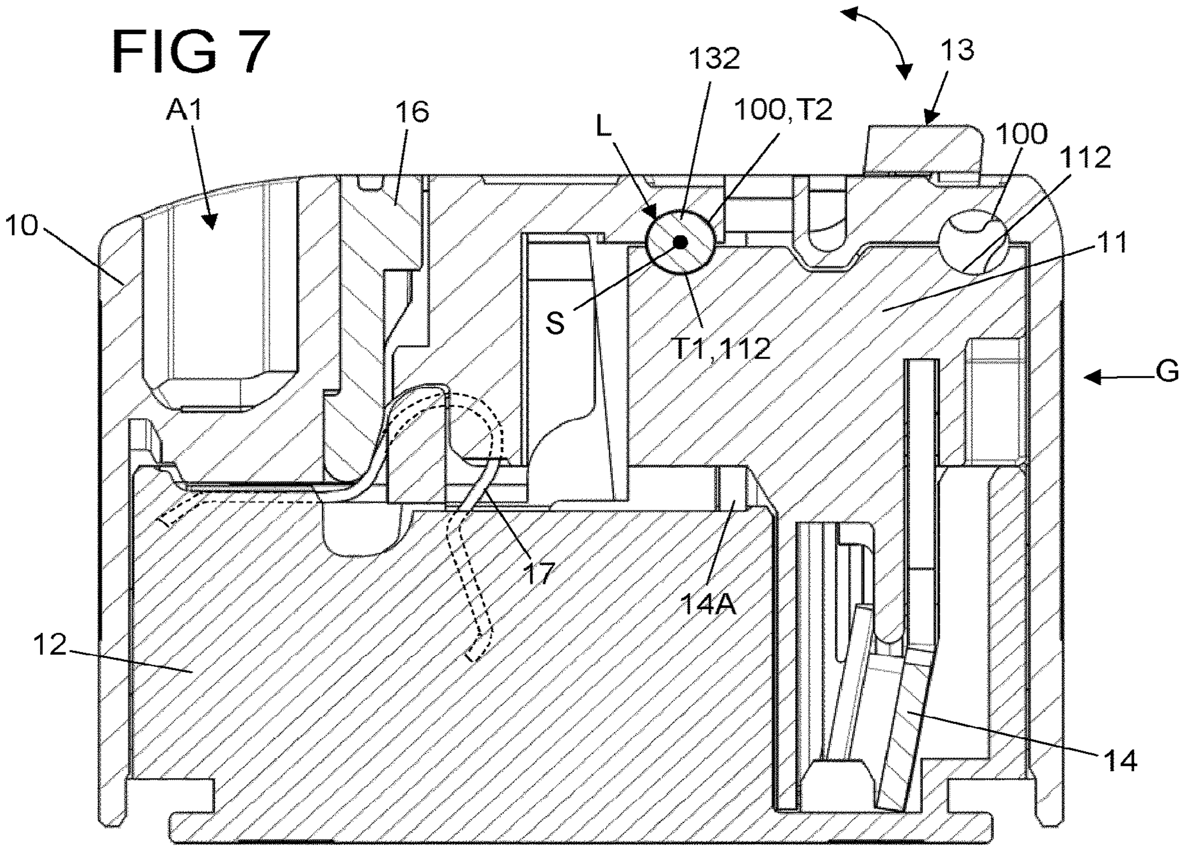
FIG. 7 shows a cross-sectional view of the terminal according to FIG. 1.

Furthermore, the second housing part 11 comprises, for each of the connections A1-A6 (which can be electrically connected to the collecting connection A via a disconnecting element 13 in each case), a bearing 115 for a contact spring 17 shown in FIG. 7. The second housing part 11 can also be referred to as a spring holder.

Figure 6:
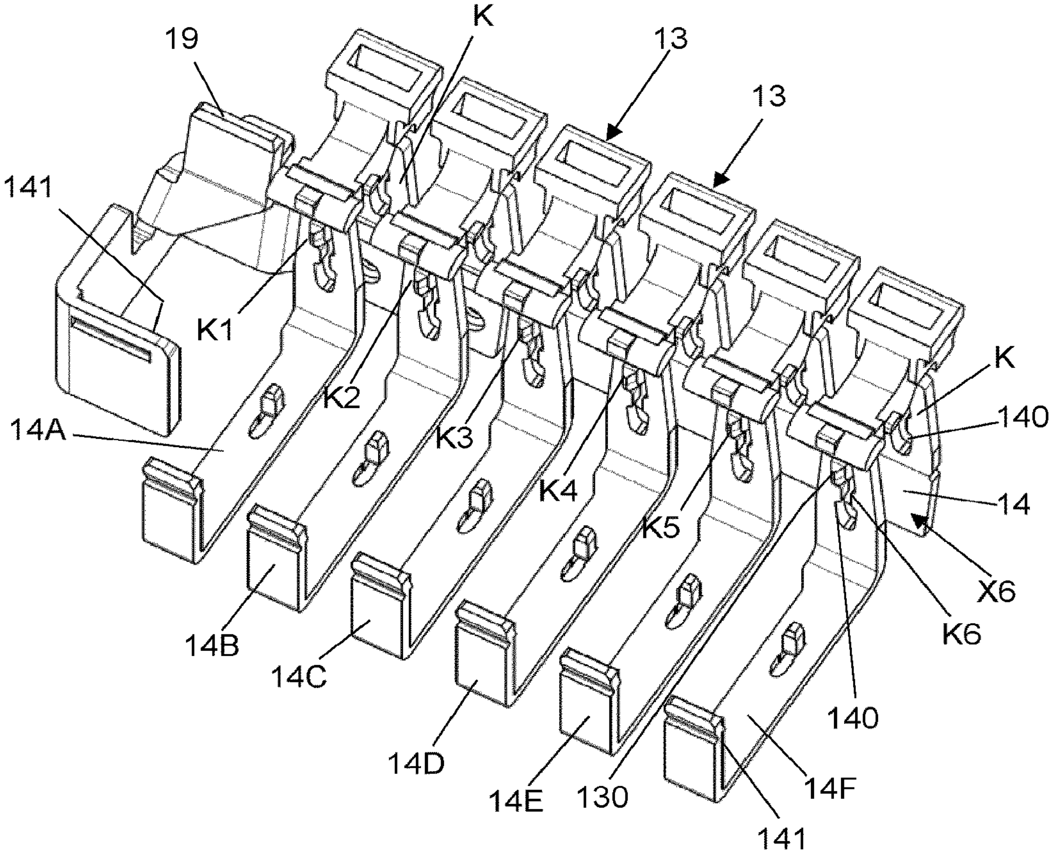
FIG. 6 shows a view of multiple connection conductors, which form electrically-contactable contacts by means of the disconnecting elements, and of the disconnecting elements of the terminal according to FIG. 1.

FIG. 6 shows the disconnecting elements 13 in the contact position, in which the respective contact blade 130 electrically contacts both associated contacts K, K1-K6. The contact K of the collecting connection A is formed on a slot 140 (in a projecting portion) of the collecting connection conductor 14. The respective contacts K1-K6 of the individual connections A1-A6 are each formed on a slot 140 (in a projecting portion) of the corresponding connection conductor 14A-14F.

The collecting connection conductor 14 comprises a contact region 141 which can be electrically contacted by the electrical line L1 plugged into the collecting connection A.

Each of the connection conductors 14A-14F comprises a contact region 141, which can be electrically contacted by the electrical line L2 plugged into the corresponding connection A1-A6. The connection conductors 14A-14F are each U-shaped, wherein the contact region 141 and the portion with the slot 140 each form one of the two legs of the U.

The arrangement shown in FIG. 6 of (collecting) connection conductors 14, 14A-14F is arranged in the interior of the terminal 1—specifically, between the first, second, and third housing parts 10, 11, 12.

Figure 8:
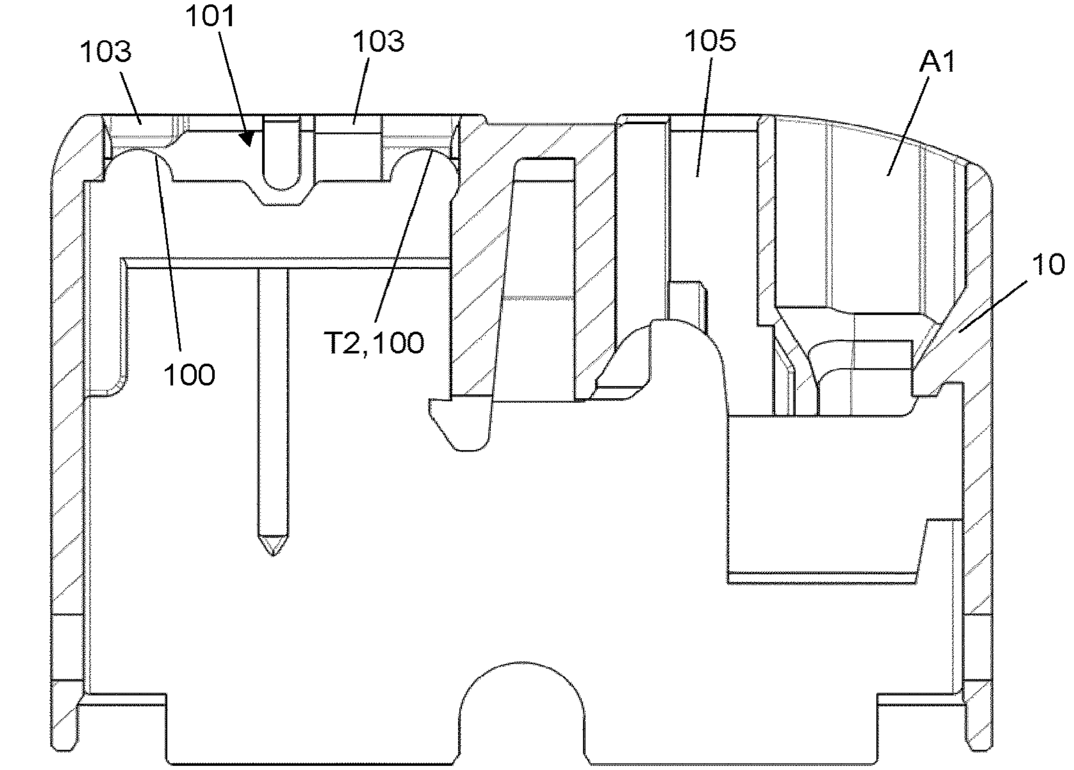
FIG. 8 shows a cross-sectional view of the first housing part of the housing of the terminal according to FIG. 1.

FIGS. 7 and 8 show a view of the interior of the terminal 1. It can be seen in particular that the housing G comprises the first housing part 10 and the second housing part 11, each of which forms a portion T1, T2 of the mounting region L.

In cross-section, the two portions T1, T2 of the mounting region L each describe a circular arc of (slightly) less than a semicircle. The two portions T1, T2 of the mounting region L are each formed by a recess 100, 112 in the first housing part 10 and in the second housing part 11. The recesses 100, 112 of the mounting region L together define a circular-cylindrical cavity.

A pin 132 of the corresponding disconnecting element 13 is received in the mounting region L. Specifically, each disconnecting element 13 comprises, on both sides, a pin 132 (which are arranged coaxially), which is received in each case in a corresponding mounting region L. The disconnecting element 13 is mounted on the mounting region L (specifically, on the mounting regions L) so as to be pivotable about a pivot axis S. During a pivoting movement about the pivot axis S, the respective disconnecting element 13 can be moved within the receptacle R (and pivoted at least in part out of the receptacle R), as illustrated in FIG. 7 by means of a double arrow. For this purpose, the receptacle R extends at least in portions perpendicularly to the pivot axis S. In the present case, all disconnecting elements 13 can be pivoted about coaxial pivot axes S.

Since both the first housing part 10 and the second housing part 11 can be produced with an injection-molding tool without slides, because the receiving portions 101, 111 of the mounting regions L do not have any undercuts, the first housing part 10 can be formed with closed outer walls 102—specifically, in particular at the point where an imaginary extension of the pivot axis S meets the (two opposite) outer walls 102.

As already mentioned, the connections A, A1-A6 are designed in the form of push-in connections. For this purpose, a contact spring 17 is provided for each of the connections A, A1-A6. The contact spring 17 is mounted on the corresponding bearing 115 of the second housing part 11. The contact spring 17 comprises two spring legs. An electrical line L1, L2 plugged into the corresponding connection A, A1-A6 displaces a spring leg of the contact spring 17, slides along an end edge thereof, and is then pushed by the spring leg of the contact spring 17 in an electrically-contacting manner against the corresponding contact region 141.

In order to disconnect the electrical line L1, L2 from the connection A, A1-A6 again, the slide 16 can be pushed deeper into the housing G, such that the slide 16 detaches the spring leg of the contact spring 17 from the electrical line L1, L2, and the latter can be removed in a non-destructive manner.

The combination of the push-in connections with the receptacles R allows a particularly compact design, since the unlocking by the slide 16 can be arranged in a particularly space-saving manner between the receptacle of the respective connection A1-A6 and the corresponding receptacle R, and because the shape of the connection conductors 14A-14F adapted for this purpose can be used synergistically for contacting the contact spring 17. The connections A1-A6 have, for example, a nominal cross-section of approximately 6 $mm^2$ for the pluggable (stripped) electrical lines L1.

In particular, FIG. 7 shows that the housing G has an underside on which assembly material can optionally be fastened—in particular, assembly material adapted according to the place of use. For example, a double-sided adhesive tape can be affixed to the planar underside. Alternatively or additionally, corresponding rails can be connected to bilateral guides shown in FIG. 7. Furthermore, it is possible to connect assembly modules by means of the already mentioned form-locking means—for example, with assembly modules with at least one screw hole. In particular, since the housing G can be designed to be closed, a floating connection in a non-fixed assembly is also possible.

The terminal 1 consequently forms a collecting block with connections for the collecting connection conductor in the form of a busbar and individual connections (the connections A1-A6) leading therefrom, and with a disconnecting zone for each individual connection. The terminal 1 can serve in particular as a potential collecting block or potential distributing block.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Terminal
10 First component (housing part)
100 Recess
101 Receiving portion
102 Outer wall
103 Insertion bevel
104 Recess
105 Shaft
106 Opening
11 Second component (housing part)
110 Partition wall
111 Receiving portion
112 Recess
114 Holder
115 Bearing
12 Third housing part
120 Latching hook
121 Cage
122 Gap
13 Disconnecting element
130 Contact blade
131 Pivot body
132 Pin
133 Engagement region
14 (Collecting) connection conductor
14A-14F Connection conductor
140 Slot
141 Contact region
15 Display
16 Slide
17 Contact spring
A (Collecting) connection
A1-A6 Connection
G Housing
K, K1-K6 Contact
L Mounting region
L1, L2 Electrical line
R Receptacle
S Pivot axis
T1, T2 Portion
W Tool
X1-X6 Disconnecting point

The invention claimed is:

1. A terminal for electrical lines, comprising:

a housing forming a mounting region on which a disconnecting element is mounted so as to move between a contact position, in which the disconnecting element electrically interconnects two contacts, and a disconnecting position, in which the disconnecting element electrically disconnects the two contacts from each other, wherein two components of the terminal each form at least one portion of the mounting region.

2. The terminal of claim 1, wherein, in cross-section, the two portions of the mounting region describe a circular arc.

3. The terminal of claim 1, wherein the disconnecting element is mounted on the mounting region so as to pivot about a pivot axis.

4. The terminal of claim 3, wherein the housing forms a receptacle within which the disconnecting element is movable, and wherein the receptacle extends in the housing perpendicularly to the pivot axis.

5. The terminal of claim 3, wherein at least one of the housing parts has at least one outer wall which is closed at a point to which the pivot axis points.

6. The terminal of claim 1, wherein one of the two components comprises a housing part in a form of an upper shell, into which the second component is insertable.

7. The terminal of claim 6, wherein the housing part and a further housing part are latchable with one another in a form-fitting manner by latching hooks.

8. The terminal of claim 1, wherein the disconnecting element comprises a contact blade, which is insertable in an electrically contacting manner into at least one slot of a connection conductor, which is electrically connected to one of the contacts.

9. The terminal of claim 1, wherein the disconnecting element comprises an engagement region to which a tool is applicable in order to move the disconnecting element between the contact position and the disconnecting position by the tool.

10. The terminal of claim 1, wherein the housing parts comprise plastic injection-molded parts.

11. The terminal of claim 1, wherein the housing forms multiple connections for electrically connecting one electrical line in each case, and wherein at least one of the connections comprises a form of a push-in connection.

12. The terminal of claim 1, wherein the terminal comprises a form of a disconnecting terminal.

* * * * *